(12) United States Patent
Watanabe

(10) Patent No.: US 6,264,303 B1
(45) Date of Patent: *Jul. 24, 2001

(54) OPTICAL LINEAR ENCODER AND RECORDING APPARATUS USING THE SAME

(75) Inventor: Itaru Watanabe, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/774,878

(22) Filed: Dec. 27, 1996

(30) Foreign Application Priority Data

Jan. 10, 1996 (JP) .................................... 8-001874

(51) Int. Cl.[7] .................................................. B41J 23/00
(52) U.S. Cl. ............................................................ 347/37
(58) Field of Search ...................... 347/37; 250/200–239; 101/425; 346/139 R; 400/705, 705.1

(56) References Cited

U.S. PATENT DOCUMENTS 4,951,066 * 8/1990 Terasawa et al. ...................... 347/33
5,075,609 * 12/1991 Ito et al. ................................ 318/696
5,430,468 * 7/1995 Sasai et al. ............................ 347/216
5,573,236 * 11/1996 Petocchi et al. ................... 271/265.02
5,627,571 * 5/1997 Anderson et al. ...................... 347/19

FOREIGN PATENT DOCUMENTS 1-221271   9/1989  (JP) .
6-340148 * 12/1994  (JP) .

* cited by examiner

Primary Examiner—John Barlow
Assistant Examiner—Michael S Brooke
(74) Attorney, Agent, or Firm—Fitzpatrick, Cella, Harper & Scinto

(57) ABSTRACT

A detection unit for optically detecting the position of a carriage via a linear scale is fixed to the rear surface of the carriage that moves along the linear scale, and an absorber which serves as a cleaning member and can absorb liquid is fixed to the detection unit. The absorber moves upon movement of the carriage and slides on the scale to absorb and remove liquid contaminants such as ink, water droplets, or the like attached to the surface of the scale. Hence, generation of an error signal and a drop in signal output caused by contamination on the scale surface can be prevented, and high-resolution, high-precision position detection can be realized.

7 Claims, 5 Drawing Sheets

OPTICAL LINEAR ENCODER AND RECORDING APPARATUS USING THE SAME

BACKGROUND OF THE INVENTION

1. Field of the Invention

The present invention relates to an optical linear encoder which is used as a position detection means for detecting the position of, e.g., a carriage that reciprocally moves while carrying a recording head, and a recording apparatus using the same.

2. Related Background Art

Conventionally, various types of linear encoders are used as high-precision position detection means for precisely detecting the position of, e.g., a carriage that reciprocally moves in a recording apparatus. Of these encoders, an optical encoder has high durability, is strong against disturbance such as changes in magnetic field, is inexpensive, and is suitable for high-resolution position detection since its detection unit can perform detection without contacting a linear scale. Accordingly, the optical encoder is popularly used in high-performance recording apparatuses.

However, recently, as requirements for higher performance of the apparatus become stricter, the optical linear encoder is required to have higher precision and higher resolution, and hence, the following problems are encountered.

Inside the recording apparatus, there are many contaminants such as ink, paper powder, toner, and the like, and when such foreign matter becomes attached to the surface of the linear scale, transmission light decreases, thus lowering the signal output of the linear encoder. Japanese Laid-Open Patent Application No. 1-221271 proposed a means for controlling the total sensitivity of a photointerrupter to a predetermined value in accordance with the photointerrupter output upon scanning a linear scale. However, this means can correct slight changes in signal, but cannot solve the problem of output drop due to contamination of the scale surface. Even when the degree of contamination remains the same, such contamination influences a high-resolution encoder more seriously since the encoder has higher sensitivity.

In particular, in an ink-jet type recording apparatus, the phenomenon of scattering a small amount of ink as mist into a space upon ejecting ink from a recording head (such phenomenon will be referred to as "mist" hereinafter) is experienced, and the ink becomes readily attached to parts inside the apparatus and, especially, to the linear scale surface.

Recently, not only an optical linear encoder that simply counts the number of light and dark slits using a light-receiving element but also an encoder that attains high-resolution, high-precision detection by combining optical phenomena such as reflection, refraction, and the like are available. In such encoder, a contaminant such as a water droplet, which transmits light and serves to change the curvature of the linear scale surface, deflects transmission light of the scale from the normal optical path. Consequently, an error signal that cannot be corrected by gain adjustment is generated.

Errors caused by the error signal influence the print performance of a recording apparatus that uses the linear encoder, and accumulation of errors due to the error signals brings about stop position errors. In the worst case, a carriage which is driven at high speed may collide against other parts, and may result in mechanical damage, runaway, and the like, thus lowering the reliability and durability.

SUMMARY OF THE INVENTION

The present invention has been made to solve the above-mentioned problems, and has as its object to attain high-precision position detection by removing contaminants on the linear scale surface.

It is another object of the present invention to attain high-density recording by realizing high-resolution, high-precision position detection of the carriage.

Other objects of the present invention will become apparent from the following description of the detailed embodiments.

DESCRIPTION OF THE PREFERRED EMBODIMENTS

Figure 1:
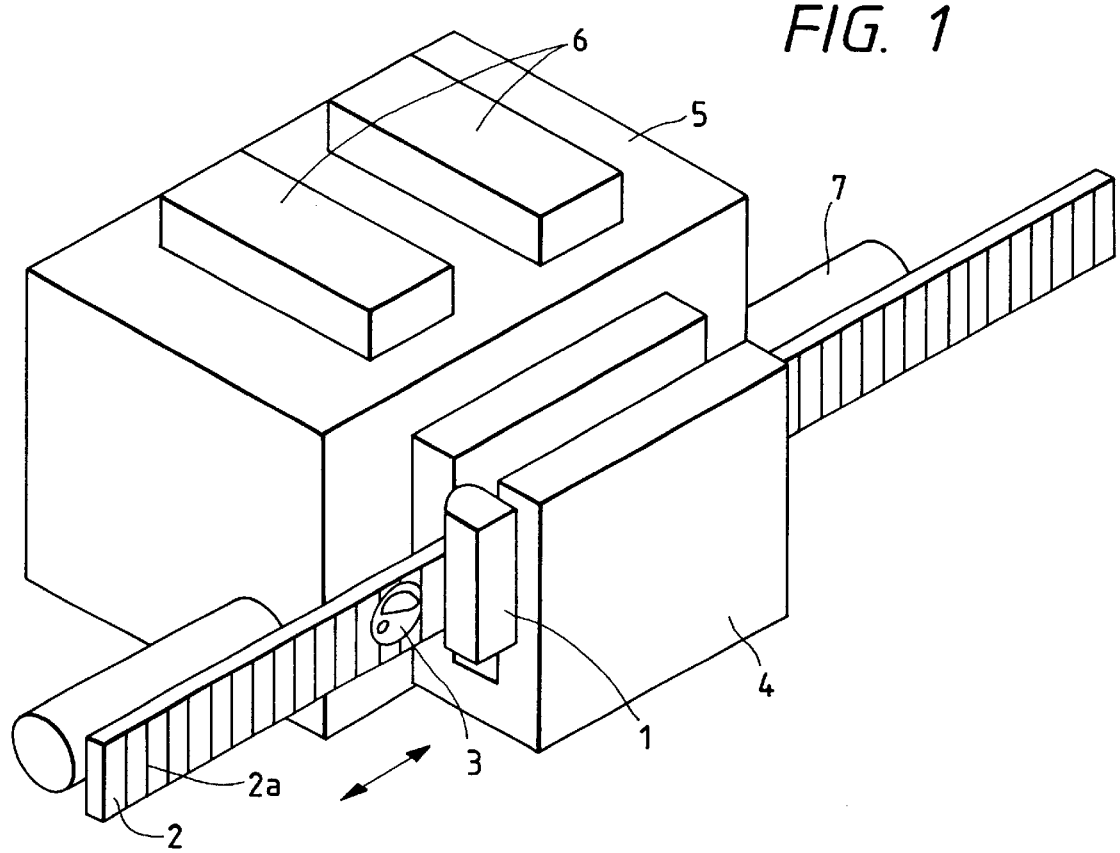
FIG. 1 is a perspective view showing a carriage and its peripheral members in a recording apparatus using an optical linear encoder according to the first embodiment of the present invention.

The preferred embodiments of the present invention will be described hereinafter with reference to the accompanying drawings. In the following description, the first to fourth embodiments will be explained. In FIGS. 4 to 10 showing the second to fourth embodiments, the same reference numerals denote common parts to those in FIGS. 1 to 3 showing the first embodiment, and a description of common parts to those in the first embodiment will be omitted in the description of the second to fourth embodiments.

[First Embodiment]

Figure 2:
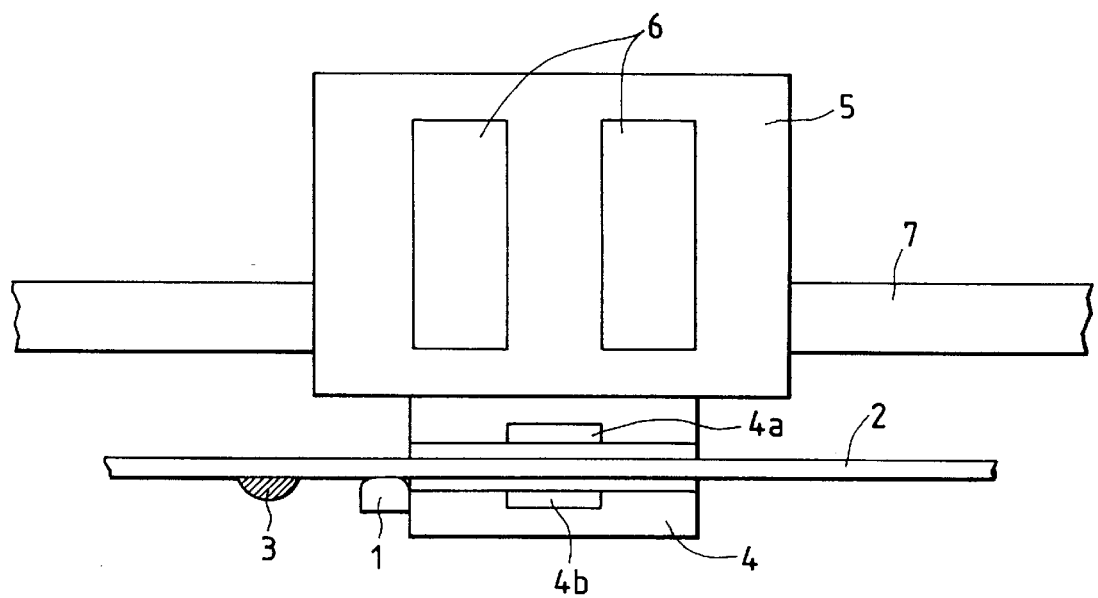
FIG. 2 is a top view showing the carriage and its peripheral members shown in FIG. 1.
Figure 3:
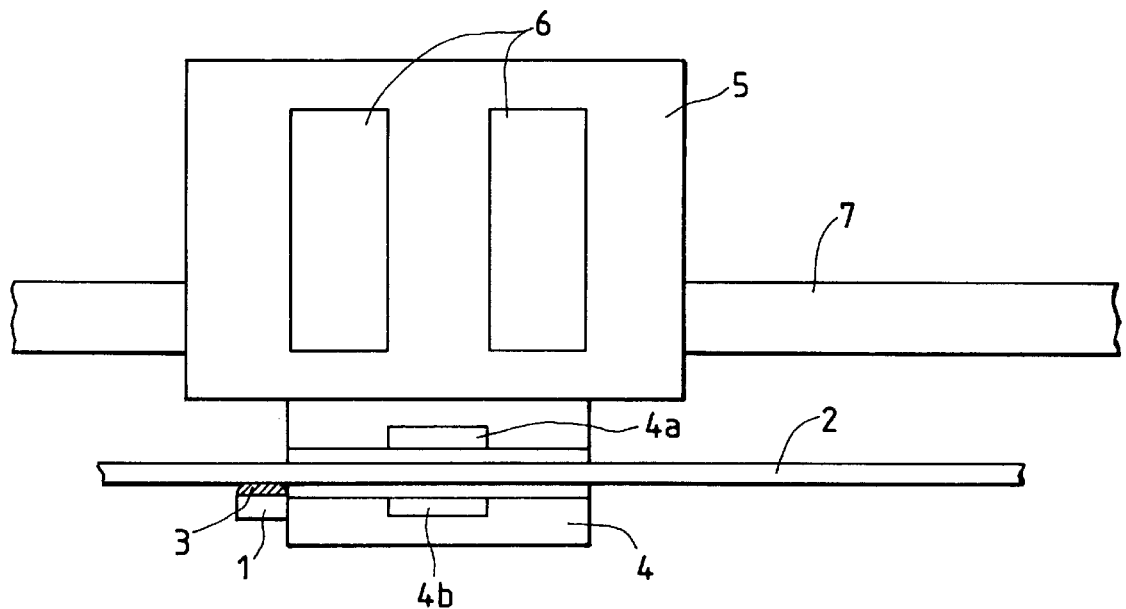
FIG. 3 is a top view showing the state wherein a cleaning member shown in FIG. 2 absorbs the contaminant on the linear scale surface.

FIGS. 1 to 3 explain the first embodiment of the present invention, and show a carriage peripheral portion provided with a linear encoder in a recording apparatus.

Referring to FIGS. 1 to 3, an absorber 1 serves as a cleaning member and can absorb contaminants such as ink, water droplets, and the like. A linear scale 2 constitutes the linear encoder. In FIGS. 1 to 3, a contaminant 3 (such as ink, water droplets, toner, paper powder, and the like) is attached to the scale 2. A linear encoder detection unit 4 constitutes the linear encoder together with the scale 2. The detection unit 4 has a light signal generation element 4a and a light-receiving element 4b. A carriage 5 reciprocally moves along the linear scale 2, and recording heads 6 are fixed on the carriage 5. The carriage 5 is slidably supported by a guide shaft 7.

In the above arrangement, the guide shaft 7 and the linear scale 2 are fixed to the recording apparatus main body and extend parallel to each other. The carriage 5 that carries the recording heads 6 travels on the guide shaft 7, and reciprocally moves along the linear scale 2, as indicated by arrows in FIG. 1.

The linear encoder detection unit 4 is fixed to the rear surface side of the carriage 5. The detection unit 4 is formed to have a U-shaped section, and the light signal generation element 4a and the light-receiving element 4b are respectively arranged in the opposing inner surfaces of the U-shaped portion. The detection unit 4 moves together with the carriage 5 while sandwiching the linear scale 2 between the inner surfaces of the U-shaped portion.

The linear encoder comprising the linear scale 2 and the detection unit 4 shown in FIG. 1 has a mechanism of outputting signal pulses as position signals when light generated by the light signal generation element 4a is intermittently shielded by dark portions of slits 2a formed at predetermined pitches on the linear scale 2 upon movement of the carriage 5 before the light reaches the light-receiving element. The recording heads 6 are driven in synchronism with the position signals to attain recording. When the recording apparatus of this embodiment is an ink-jet recording apparatus, ink droplets are ejected from nozzles (not shown) of the recording heads 6, and become attached to a recording paper sheet held on a platen (not shown) arranged to oppose the carriage 5, thus attaining recording.

In the conventional arrangement, the contaminant 3 attached to the surface of the linear scale 2 due to ink mist generated upon recording shields light generated by the light signal generation element 4a as well as the dark portions of the slits 2a of the scale 2 before the light reaches the light-receiving element 4b.

In view of this problem, in this embodiment, the absorber 1 serving as a cleaning member is fixed to the side surface of the linear encoder detection unit 4 which reciprocally moves with respect to the linear scale 2. The absorber 1 is in sliding contact with the scale 2 while reciprocally moving with respect to the scale 2 together with the carriage 5 upon recording, and absorbs and removes the contaminant 3, which causes an error signal and lowers the signal output when it moves to a position on the contaminant 3 on the surface of the scale 2, as shown in FIG. 3.

In this embodiment, the absorber 1 that moves together with the carriage 5 is in sliding contact with the linear scale 2, and absorbs and removes the contaminant 3 on the surface of the scale 2, thus cleaning the surface of the linear scale 2. In this way, generation of an error signal and a decrease in signal output caused by contamination can be prevented, and the position of the carriage 5 can be detected with high resolution and high precision, thus allowing high-density recording. Furthermore, collision, runaway, and the like of the carriage due to accumulation of carriage position detection errors caused by contamination on the surface of the linear scale 2 can be prevented, thereby improving the reliability and safety of the recording apparatus.

In the above arrangement, the absorber 1 is fixed on the side surface of the linear encoder detection unit 4, but may be fixed to the rear surface of the carriage 5 to be located in the vicinity of the detection unit 4.

On the other hand, the absorber 1 is preferably detachable from the carriage 5 to allow replacement. With this arrangement, the absorber 1 can clean well as long as it is replaced by another, and the durability of the encoder and the recording apparatus can be improved. Also, the absorber 1 can be made compact.

When the moving direction of the carriage 5 upon recording is limited to one direction, a sole absorber 1 need only be arranged on the upstream side of the one direction with respect to the detection unit 4 or the carriage 5. However, when the carriage 5 moves reciprocally, a plurality of absorbers 1 are preferably arranged on the two sides of the reciprocal moving directions with respect to the detection unit 4 or the carriage 5.

In the above arrangement, the absorber 1 is arranged on only one side surface side of the linear scale 2. Alternatively, absorbers 1 may be arranged on the two surface sides of the linear scale 2 to clean both the surfaces.

Furthermore, in the above arrangement, the absorber 1 absorbs liquids such as ink as the cleaning member. Alternatively, the absorber may be replaced by an elastic member such as a rubber member, brush, or the like to wipe off the contaminant 3 on the surface of the linear scale 2. In this case, not only a liquid contaminant but also solid dust such as wear powder generated by other portions can be similarly wiped off.

[Second Embodiment]

Figure 4:
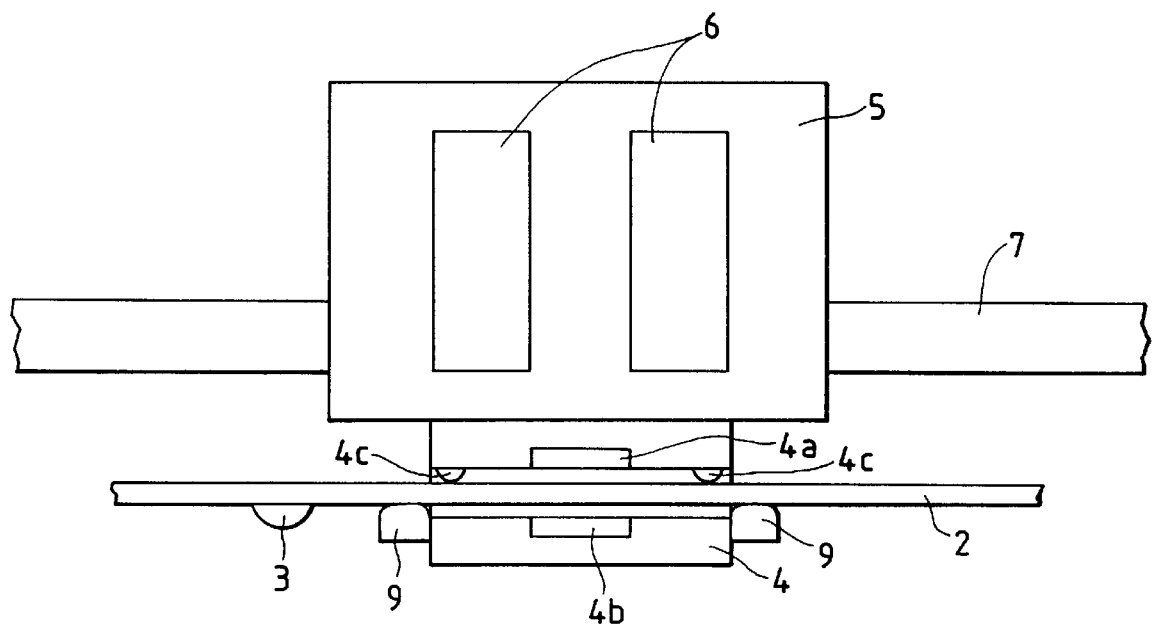
FIG. 4 is a top view showing a carriage and its peripheral members in a recording apparatus using an optical linear encoder according to the second embodiment of the present invention.

FIG. 4 shows the second embodiment of the present invention. As shown in FIG. 4, this embodiment has basically the same arrangement as that of the first embodiment shown in FIG. 2, but has a slightly different arrangement of the linear encoder detection unit 4. That is, positioning slide members 4c having a semicircular section respectively project from the two end portions, in the right-and-left direction in FIG. 4 (the moving direction of the carriage 5), of the inner surface, with the light signal generation element 4a, of the U-shaped portion of the detection unit 4.

In place of the absorber 1 in the first embodiment, elastic cleaning members 9 are fixed to the two side surfaces, in the right-and-left direction in FIG. 4, of the detection unit 4 at positions opposite to the positioning slide members 4c to sandwich the linear scale 2 therebetween.

In this arrangement, the cleaning members 9 slide on the linear scale 2 upon movement of the carriage 5 and remove the contaminant 3 attached to the surface of the scale 2, thus obtaining the same effect as in the first embodiment. Furthermore, in this embodiment, the elastic cleaning members 9 elastically press the linear scale 2 against the positioning slide members 4c. With this structure, the position of the linear scale 2 is determined to be separated by a predetermined distance from the light-receiving element 4b, and the distance between the light-receiving element 4b and the surface of the linear scale 2 can be maintained with high precision.

In this embodiment, the distance between the light-receiving element 4b and the surface of the linear scale 2 can be maintained with high precision to cope with the gap characteristics between the linear scale 2 and the detection unit 4, which become sharper as the linear encoder shifts to a higher resolution, thereby stabilizing the position detection performance.

In the above arrangement, one or both of the positions of the positioning slide members 4c and one or both of the positions of the cleaning members 9 replace each other, so that the positioning slide members 4c may be arranged on the light-receiving element 4c side, and the cleaning members 9 may be arranged on the light signal generation element 4a side. When the positions of both the members replace each other, the surface on the opposite side of the scale 2 can be cleaned; when the positions of one of these members replace each other, both surfaces of the scale 2 can be cleaned.

The cleaning members 9 may be fixed to the carriage 5 as in the absorber 1 in the modification of the first embodiment. Also, it is preferable that the cleaning members 9 be detachable from the detection unit 4 or the carriage 5 to allow replacement.

[Third Embodiment]

Figure 5:
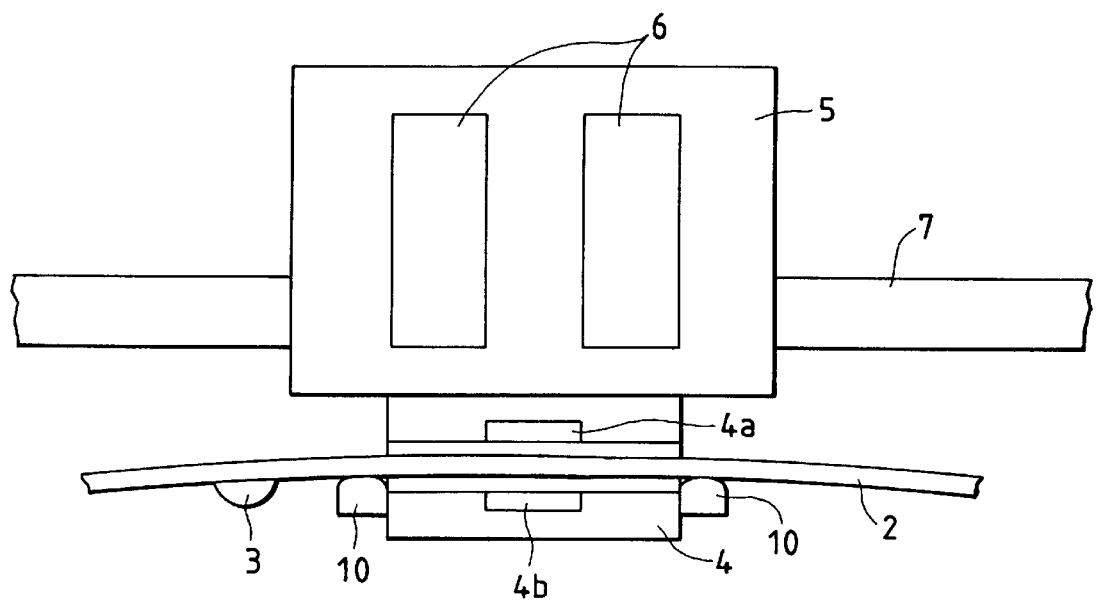
FIG. 5 is a top view showing a carriage and its peripheral members in a recording apparatus using an optical linear encoder according to the third embodiment of the present invention.

FIG. 5 shows the third embodiment of the present invention. As shown in FIG. 5, the arrangement of this embodiment is basically the same as that of the first embodiment shown in FIG. 2, except that a pair of cleaning members 10 which also serve as positioning members for positioning the linear scale 2 with respect to the detection unit 4 are respectively fixed to the two side surfaces, in the right-and-left direction in FIG. 5, of the encoder detection unit 4, in place of the absorber 1 in the first embodiment. In this embodiment, the linear scale 2 is slightly flexed, and is pressed against the cleaning members 10 by the tensile force that acts to make the scale 2 linear.

With this arrangement, the cleaning members 10 slide on the linear scale 2 upon movement of the carriage 5, and remove and clean the contaminant 3 on the surface of the scale 2, thus obtaining the same effect as in the first embodiment. Furthermore, in this embodiment, the linear scale 2 is positioned when it is pressed against the cleaning members 10, thus maintaining the distance between the light-receiving element 4b and the surface of the scale 2 with high precision. With this structure, as in the second embodiment, the gap characteristics between the linear scale 2 and the detection unit 4, which become sharper as the resolution becomes higher, can be handled, and the position detection performance can be stabilized.

In the arrangement shown in FIG. 5, the cleaning members 10 are arranged on the light-receiving element 4b side, but may be arranged on the light signal generation element 4a side.

The cleaning members 10 may be fixed to the carriage 5 as in the modifications of the first and second embodiments. Also, it is preferable that the cleaning members 10 be detachable from the detection unit 4 or the carriage 5 to allow replacement.

[Fourth Embodiment]

The fourth embodiment of the present invention will be described below with reference to FIGS. 6 to 10.

Figure 6:
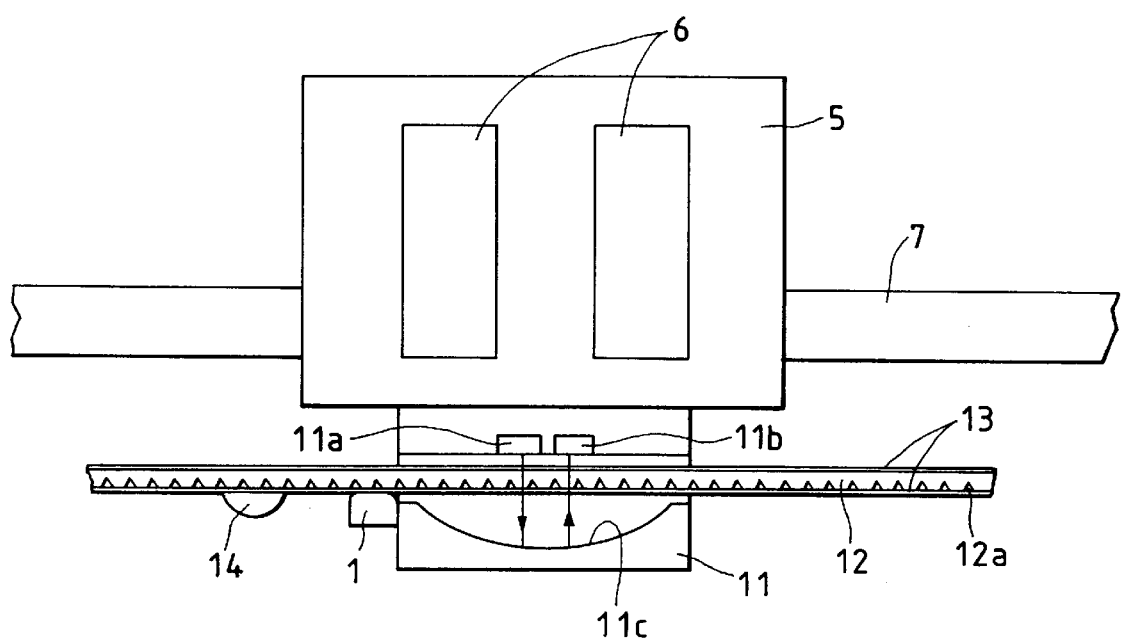
FIG. 6 is a top view showing a carriage and its peripheral members in a recording apparatus using an optical linear encoder according to the fourth embodiment of the present invention.

FIG. 6 shows the arrangement of this embodiment. In this embodiment, a linear encoder utilizes reflection and refraction of light, and the arrangements of an encoder detection unit 11 and a linear scale 12 are different from those in the above embodiments.

The encoder detection unit 11 has a U-shaped section as a whole, and a light signal generation element 11a and a light-receiving element 11b are juxtaposed on one inner surface of the U-shaped portion. A concave reflection mirror 11c is arranged on the other inner surface of the U-shaped portion, and opposes the light signal generation element 11a and the light-receiving element 11b.

Grooves 12a each having a V-shaped section are formed on one surface of the linear scale 12 at predetermined intervals in the longitudinal direction. Furthermore, surface protection films 13 are adhered on the two surfaces of the scale 12.

Other arrangements are the same as those in the first embodiment, and the absorber 1 serving as a cleaning member is fixed to one side surface of the encoder detection unit 11. Note that a contaminant denoted by reference numeral 14 on the scale 12 is one that transmits light and acts to change the curvature of the surface of the scale 12, and is assumed to be a water droplet herein.

In the above arrangement, the absorber 1 slides on the linear scale 12 upon movement of the carriage 5, and cleans the linear scale 12 as in the first embodiment.

In this embodiment, the principle of position detection of an encoder that utilizes reflection and refraction is different from that of other embodiments. The principle will be briefly described below. In FIG. 6, light generated by the light signal generation element 11a is transmitted through the film 13, the main body of the scale 12, and the film 13, as indicated by an arrow in FIG. 6, and is reflected twice by the concave reflection mirror 11c to propagate in the opposite direction. Then, the light is transmitted through the film 13, the main body of the scale 12, and the film 13 again, and reaches the light-receiving element 11b.

Figure 7:
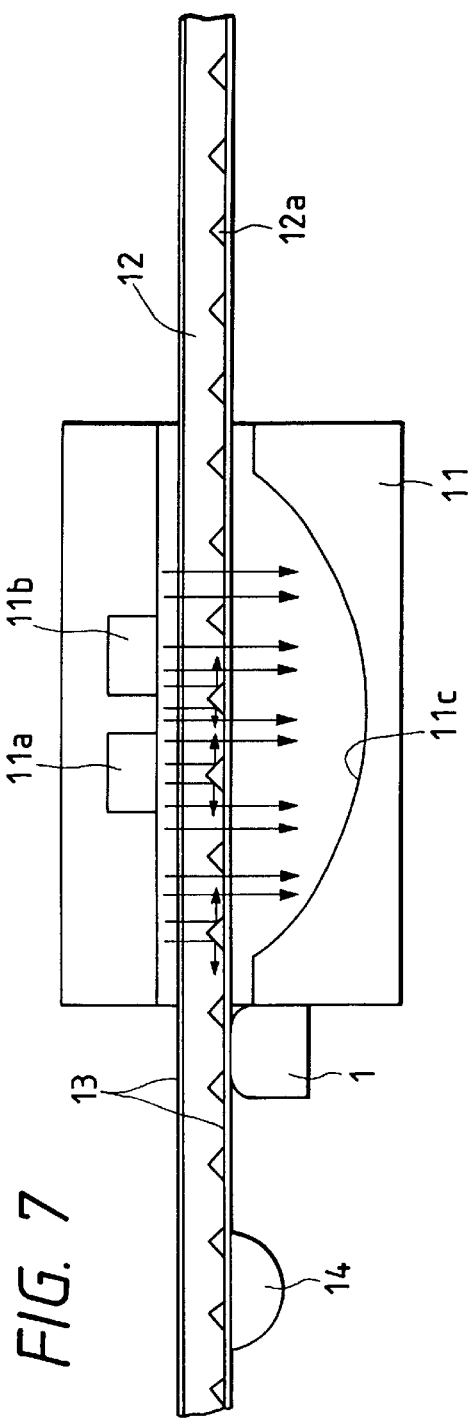
FIG. 7 is an explanatory view for explaining the principle of position detection in the fourth embodiment shown in FIG. 6.
Figure 8:
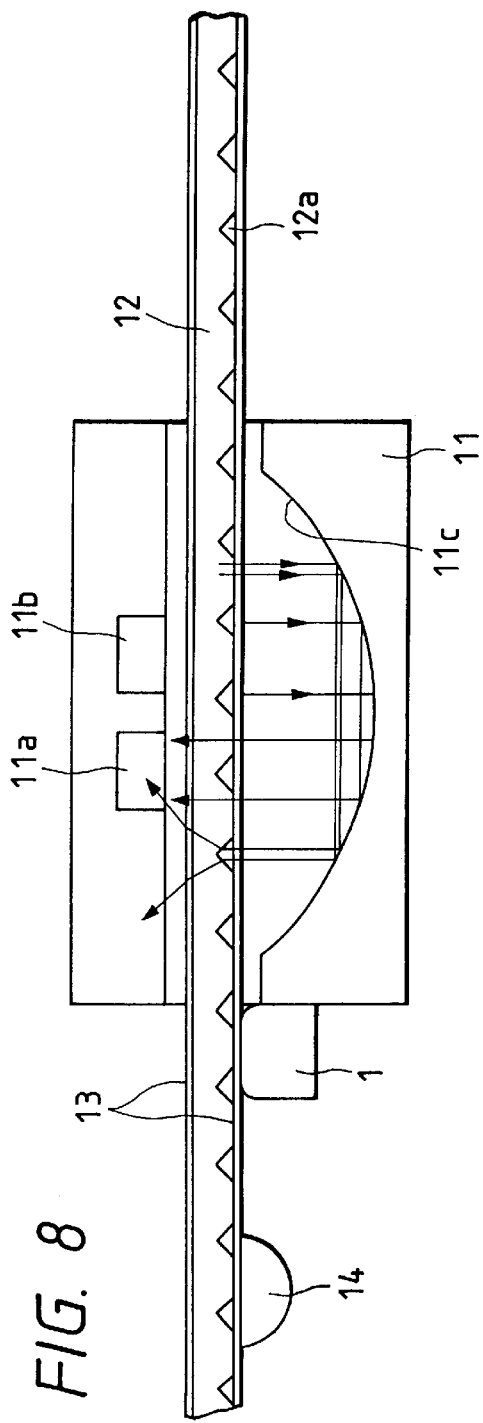
FIG. 8 is an explanatory view for giving further explanation of the principle of position detection in FIG. 7.

In this case, as indicated by arrows in FIG. 7, light that reaches each V-shaped groove 12a formed on the linear scale 12 in the forward path of the light from the light signal generation element 11a cannot be transmitted through the scale 12 since it is totally reflected by the groove 12a, and light that reaches a flat portion other than the grooves 12a is transmitted through the scale 12.

In this way, by utilizing reflection, in the forward path, of the light generated by the light signal generation element 11a, grating-like light and dark slit patterns are formed. The light that has been transmitted through the scale 12 with the grating-like light and dark slit patterns, is reflected twice by the concave reflection mirror 11c, as indicated by arrows in FIG. 8, and is incident on the scale 12 again. In this case, some light components are refracted by the grooves 12a, and some other light components are transmitted straight through the flat portion, thereby improving the resolution by the combination of these light components.

Figure 9:
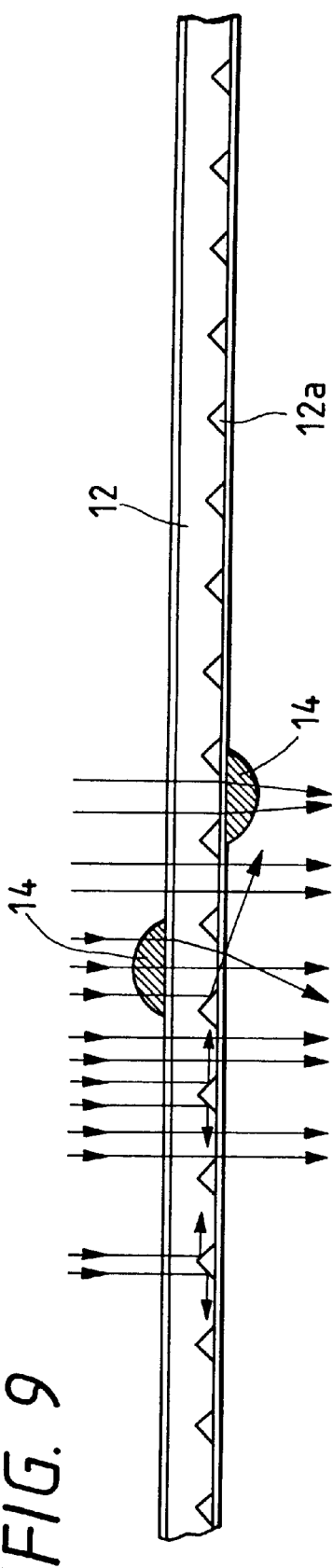
FIG. 9 is a view showing detection light in the forward path, which is disturbed by the contaminant on the scale surface in the position detection shown in FIG. 6.
Figure 10:
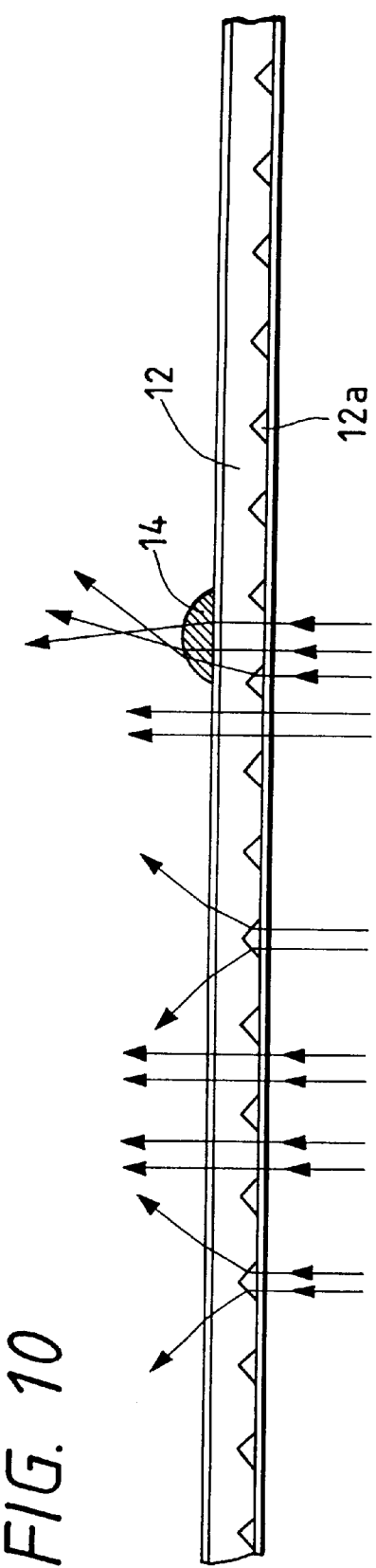
FIG. 10 is a view showing detection light in the backward path, which is disturbed by the contaminant on the scale surface in the position detection shown in FIG. 6.

Since such principle is used, when the contaminant 14 attached to the surface of the linear scale 12 is a water droplet that transmits light and becomes attached to the surface of the scale 12 in a dome shape, the contaminant 14 changes the curvature of the surface of the scale 12, and changes and disturbs the forward and backward optical paths of the detection light, as indicated by arrows in FIGS. 9 and 10, thus generating an error signal.

In view of this problem, when the absorber 1 that reciprocally moves together with the carriage 5 absorbs the contaminant 14, generation of the error signal can be prevented and, hence, deterioration of the position detection performance can be avoided.

In this embodiment, light reciprocally passes through the linear scale twice. Of course, the same effect as in this embodiment can be obtained by cleaning the scale even in a linear encoder that utilizes other optical phenomena.

In the above arrangement, the absorber 1 may be replaced by an elastic member such as a rubber member, brush, or the like as in the modification of the first embodiment. Also, the absorber 1 may be fixed to the carriage 5, and may be detachably arranged to allow replacement. Furthermore, a plurality of absorbers may be arranged, and may be arranged on two surface sides of the scale 12.

In the description of the above embodiments, the optical linear encoder according to the present invention is arranged in the recording apparatus. Alternatively, the optical linear encoder according to the present invention can be arranged in various electronic apparatuses other than the recording apparatus to detect the position of a predetermined moving member that moves linearly, as a matter of course. In the above embodiments, the ink-jet recording apparatus has been exemplified as the recording apparatus. Alternatively, the optical linear encoder according to the present invention can be arranged in other recording apparatuses such as a thermal recording apparatus to obtain the same effects as described above.

As can be seen from the above description, according to the present invention, since an optical linear encoder, which comprises a linear scale and a detection unit which is fixed to a moving member that moves along the linear scale and optically detects the position of the moving member via the linear scale, adopts an arrangement with a cleaning member which moves together with the moving member and is in sliding contact with the linear scale so as to remove a contaminant attached to the surface of the linear scale, the surface of the linear scale can be cleaned by the cleaning member upon movement of the moving member, deterioration of position detection performance such as generation of an error signal and a drop in signal output caused by the contaminant on the surface of the linear scale can be prevented, and high-resolution, high-precision position detection can be realized. Since the linear scale is positioned with respect to the detection unit by utilizing the cleaning member, the gap characteristics between the linear scale and the detection unit, which become sharper as the position detection resolution becomes higher, can be coped with, and the position detection performance can be stabilized. When the optical linear encoder according to the present invention is arranged in an electronic apparatus to detect the position of a predetermined moving member, the performance of the electronic apparatus can be improved. Especially, when the optical linear encoder of the present invention is arranged in a recording apparatus, and detects the position of a carriage, as the moving member, that moves while carrying a recording head, the position of the carriage can be detected with high resolution and high precision, thus allowing high-density recording. Also, collision, runaway, and the like of the carriage to other parts due to accumulation of carriage position detection errors caused by contamination on the surface of the linear scale can be prevented, thus improving the reliability and durability of the recording apparatus.

What is claimed is:

1. An optical linear encoder comprising:

a carriage for a recording scan;

a linear scale disposed to permit said carriage to move along the length of said linear scale;

a detection unit which is fixed to said carriage and optically detects the position of said carriage by optically detecting said linear scale, said detection unit having a surface on which an optical signal generating element is provided and a surface on which a light-receiving element for receiving light from said optical signal generating element is provided, said surfaces being opposed to each other, and said linear scale being disposed between said opposed surfaces;

positioning slide members that slide on said linear scale are arranged on said detection unit; and cleaning members which move together with said carriage, said cleaning members being in sliding contact with said linear scale as said carriage moves along the length of said linear scale, and remove a contaminant on a surface of said linear scale, wherein said cleaning members comprise an elastic material and said cleaning members elastically press said linear scale against said positioning slide members so as to position said linear scale at a predetermined distance from said light-receiving element.

2. An encoder according to claim 1, wherein said cleaning member is provided on two sides of said detection unit on which said cleaning member is provided, the two sides being opposite to one another in the moving direction of said carriage.

3. An encoder according to claim 1, wherein said positioning slide member is provided on two sides of said detection unit on which said positioning slide member is provided, the two sides being opposite to one another in the moving direction of said carriage.

4. An encoder according to claim 1, wherein at least one of said positioning slide members is provided on the surface on which said optical signal generating element is provided, and at least one of said cleaning members is provided on a surface opposed to said surface on which said optical signal generating element is provided.

5. A recording apparatus which comprises an optical linear encoder for detecting a position of a recording head for a recording scan, comprising:

a carriage which carries the recording head, said carriage moving for the recording scan;

a linear scale disposed to permit said carriage to move along the length of said linear scale;

a detection unit which is fixed to said carriage and optically detects the position of said carriage by optically detecting said linear scale, said detection unit having surfaces which are opposed to each other and comprising an optical signal generating element provided on one of said surfaces and a light-receiving element for receiving light from said optical signal generating element provided on another of said surfaces, and said linear scale being disposed between said opposed surfaces;

positioning slide members that slide on said linear scale arranged on said detection unit; and cleaning members which move together with said carriage, said cleaning members being in sliding contact with said linear scale as said carriage moves along the length of said linear scale, and removing a contaminant on a surface of said linear scale, wherein said cleaning members comprise an elastic material and said cleaning members elastically press said linear scale against said positioning slide members so as to position said linear scale at a predetermined distance from said light-receiving element.

6. An apparatus according to claim 5, wherein said recording head comprises an ink-jet recording head.

7. An apparatus according to claim 5, wherein at least one of said positioning slide members and at least one of said cleaning members are provided on opposed surfaces of said detection unit.

* * * * *